United States Patent

[11] 3,581,069

[72] Inventor Arthur M. Pederson
Mercer Island, Wash.

[21] Appl. No. 682,841
[22] Filed Nov. 14, 1967
[45] Patented May 25, 1971
[73] Assignee The United States of America as represented by the Secretary of the Navy

[54] FREQUENCY TO BINARY CONVERTER
7 Claims, 3 Drawing Figs.

[52] U.S. Cl. .......... 235/92
[51] Int. Cl. .......... H03k 23/00
[50] Field of Search .......... 235/92; 315/84.5; 324/78

[56] References Cited

OTHER REFERENCES

Ross E. Hupp, "Frequency Counter", Oct. 1960 From-Vol. 33 No. 10 "Instruments and Control Systems" page 1715

*Primary Examiner*—Maynard R. Wilbur
*Assistant Examiner*—Charles D. Miller
*Attorneys*—J. P. Dunlavey, J. O. Tresansky and H. R. Booher

ABSTRACT: A sound velocity frequency signal to binary signal conversion and storage system. A high frequency crystal controlled oscillator and counter are controlled by a velocimeter counter to supply a binary number to binary storage flip-flops in accordance with the pulse frequency rate input to the velocimeter counter. The number stored is inversely proportional to the average sound velocity for the period of measurement.

INVENTOR
Arthur M. Pederson
BY
J.O. Tresansky
ATTORNEY
HR Booker
AGENT

FREQUENCY TO BINARY CONVERTER

BACKGROUND OF THE INVENTION

The invention generally relates to signal converters and more particularly to frequency to binary signal converters.

Frequency to binary converters are known which comprise counting apparatus and frequency meters for delivering an output signal in binary form proportional to the rate of sequentially received signals. These systems are generally of the type which require frequency multiplication techniques on the received signal. For direct counting with these techniques, complex electronic circuitry including rate multipliers and synchronizing means are necessary.

The present invention was developed to provide a continuous monitor of sound velocity in sea water as a velocimeter is moved through water. The accuracy provided by direct counting methods of the past has not been entirely satisfactory. Without the use of the frequency multiplication techniques mentioned above, satisfactory measurement accuracy could not be obtained without increasing the periods of measurement to an undesirable length of time. For example, to obtain the accuracy of the invention, direct counting would require 1 second per measurement or in other words, when moving the velocimeter at 6 knots, only one reading in 10 feet could be obtained. The invention contemplates more than 200 readings per second with no loss in accuracy. The complex electronics, however, of the rate multiplier type of frequency meters make the meters expensive and require considerable calibration to maintain the accuracy and speed of measurement desired.

SUMMARY OF THE INVENTION

The general purpose of the invention is to provide an accurate, rapid and inexpensive variable frequency to binary converter system and in particular to provide such a system for recording in binary form the variable frequency output of a velocimeter.

It is an object, therefore, of the present invention to overcome the disadvantages and limitations of prior frequency conversion devices by providing a new and improved frequency conversion system.

It is also an object of the invention to provide a new and improved frequency to binary signal converter.

The above and other objects are attained by a variable frequency to binary converter and storage system having a high frequency crystal controlled oscillator and counter measuring the time period for a predetermined number of pulse inputs, a variable frequency pulse counter controlling the oscillator and time period counter, and binary storage means for storing a number representing the time period which number is inversely proportional to the variable frequency input.

BRIEF DESCRIPTION OF THE DRAWING

The foregoing and other objects, features, and attendant advantages of the invention will be appreciated as the same become better understood by the accompanying drawings wherein.

DETAILED DESCRIPTION OF THE PREFERRED EMBODIMENT

Figure 1:
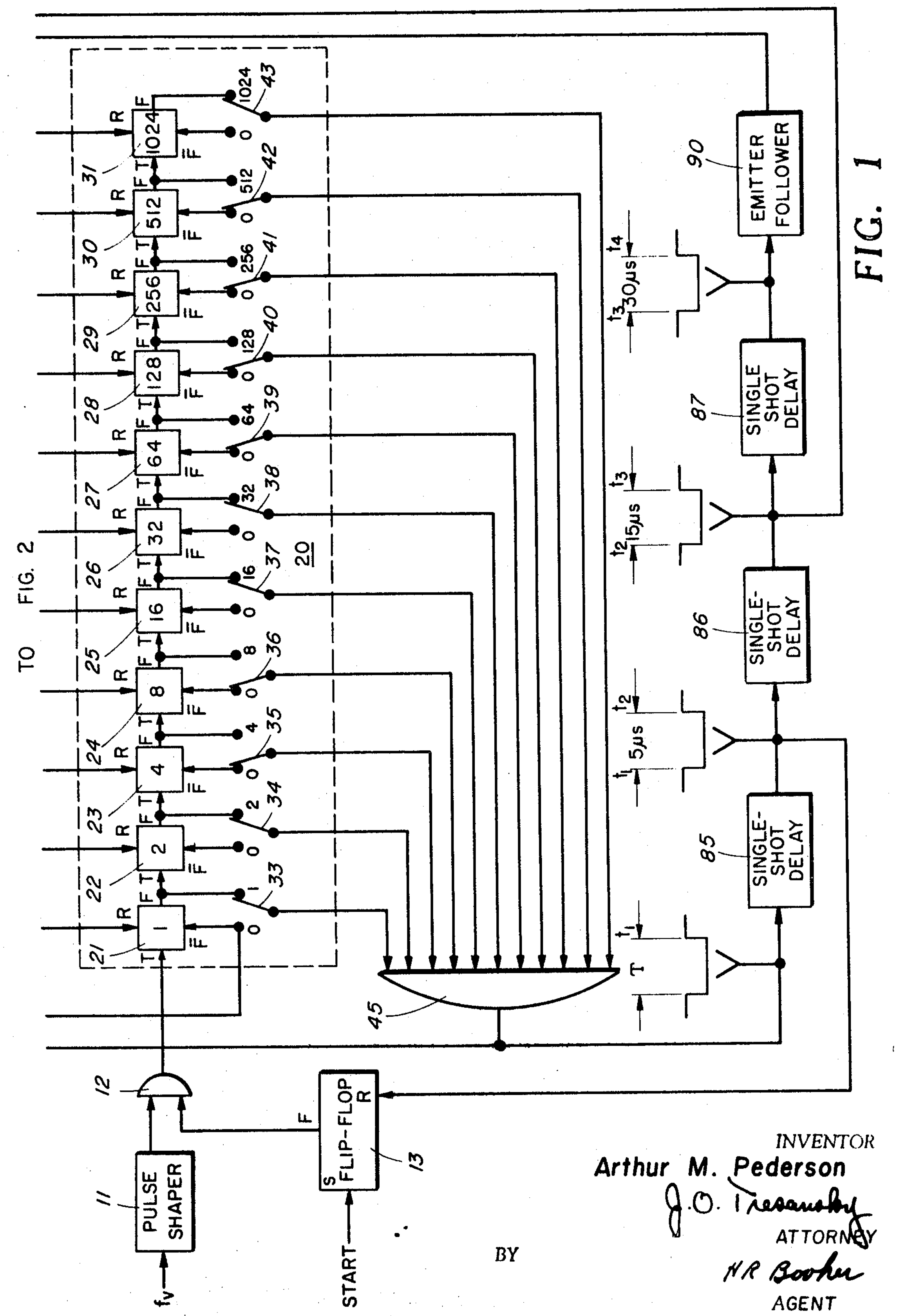
FIGS. 1 and 2 are a schematic circuit block diagram of one embodiment of the invention illustrating the frequency to binary converter.
Figures 2, 3:
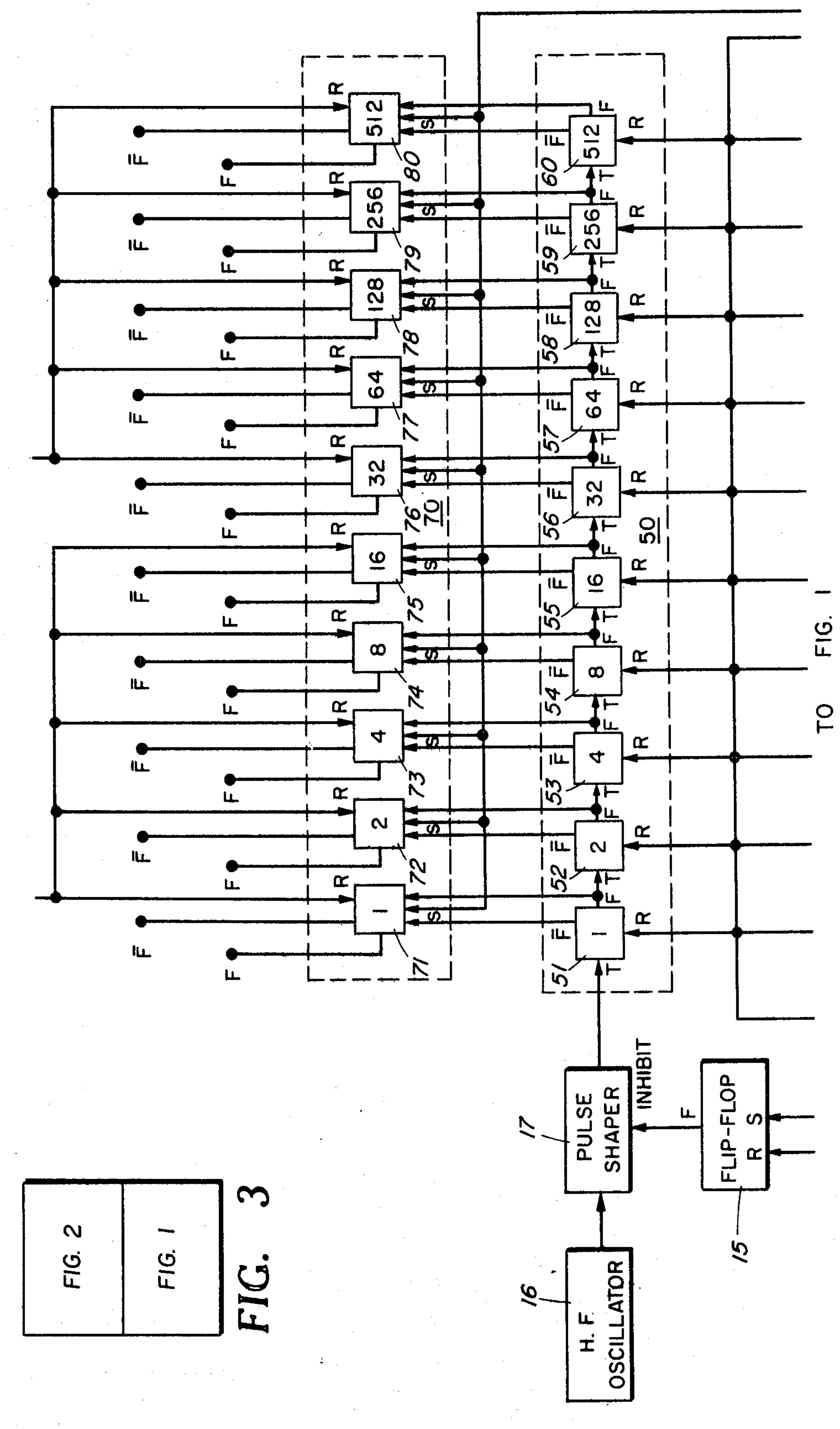
FIG. 3 illustrates how FIGS. 1 and 2 fit together.

The frequency to binary signal converter shown in the FIGS. has a variable frequency velocimeter input to pulse shaper 11. A time period T is generated by counting a fixed number of pulses from pulse shaper 11 with counter 20. When a START pulse is received from a recorder, AND gate 12 opens from the setting of flip-flop 13 and permits variable frequency pulses to reach counter 20.

Counter 20 has 11 counting stages 21 to 31 each of which has a trigger input terminal T, a positive output terminal F and a negative output terminal $\bar{F}$. Each of the stages can be selectively switched to either the F or $\bar{F}$ terminal. The $\bar{F}$ terminal represents a 0 count in the respective stage while the F terminals provide output signals each of which represents a digit $2^{n-1}$ where $n$ is the position of the stage in the series of counter stages. For example, the first stage 21 where $n$=1, the output terminal F is $2^0$ or 1. Similarly stage 22 has an output terminal F representative of $2^1$ or equal to 2 and so on to stage 31 with F representing $2^{10}$ or 1024.

Selection switches 33 to 43 in counter 20 may be set to count any number N of received pulses from 1 to 2047. In the FIGS. the switches are set for N=1075. At the end of the 1075th period, a pulse appears at the output of AND gate 45 signifying the end of the time period T, and ending at time instant $t_1$ in the FIG.

The first pulse, registered by counter 20 in stage 21 after the start pulse sets flip-flop 13, is used to set flip-flop 15, which opens the gate to high frequency oscillator 16 and counter 50. When flip-flop 15 has a set pulse applied to it, a pulse signal on the F output acts to remove the inhibit signal which is normally supplied to the pulse shaper 17, thereby enabling pulse shaper 17 to pass and shape high frequency pulses from the oscillator 16. High frequency oscillator 16 may, for example, be a crystal controlled 200 kc. oscillator.

Stages 51 to 60 of counter 50 have trigger inputs connections from the pulse shaper 17 to the first stage and from the F (positive) terminal in the successive stages (second to ninth). Each successive stage represents, as in the counter 20, the number corresponding to $2^{n-1}$ where $n$ is the position of the stage in the series.

At the end of the time period T (at time $t_1$) flip-flop 15 is reset, thus closing the inhibit gate to pulse shaper 17 and preventing further oscillator pulse to pass to counter 50.

The output pulse from AND gate 45 at time $t_1$ also triggers single-shot delay network 85 which provides a 5 $\mu$sec delay in the embodiment shown. At time $t_2$ flip-flop 13 is reset, thus inhibiting counter 20 until the next start pulse is received. Also at time $t_2$ the negative output of single-shot delay 86 lasting for 15 $\mu$sec from time $t_2$ to $t_3$ sets binary flip-flops 71 to 80 and causes the number in counter 50 to be transferred from the $\bar{F}$ terminals to the binary storage flip-flops. At time $t_3$, the negative output of single-shot delay 87 resets to zero the counter 20 and counter 50 with a 30 $\mu$sec ($t_3$ to $t_4$) negative pulse passed through emitter follower 90.

The measurement is completed when the binary number proportional to T is registered in the storage flip-flops. This number may be recorded on magnetic tape or in other suitable permanent storage devices when the storage flip-flops are reset by pulses appearing in the R leads. The $\bar{F}$ outputs could go to recording amplifiers for example, and the F outputs could go to lamp drivers of a check unit. Some of the storage flip-flops may be reset after the start of the next measurement period but there is no problem of storage confusion if all of the flip-flops 71—80 are reset before the end of the next time period T.

An example of the operation of the device will provide a more clear understanding of the invention. The general relation between the variable frequency input and the stored time period is found in the equation $T=N/f_r$ (equation 1). In the FIG. $N$ is chosen to be 1075. Assume the variable frequency is 14.5 kc. for purposes of illustration, then $T$=74.4103 ms. The number counted by counter 50 if the oscillator is generating a 200 kc. signal during that period would be ($T$) (200 kc.) or 14,882. This number could be directly stored in the binary flip-flops, but in reality for greater storage simplicity, only the additional count above complete cycles of 1024 counts is actually stored. In the example for the count of 14,882, there are 14 cycles of 1024 counts with 546 left over. The number stored in storage 70 for a 14.5 kc. input therefore would be 546 in binary form; i.e. numbers would be stored in stages 80, 76 and 72. To find the variable frequency from the binary number stored, the following equation is used:

$$f_r=KN_1/N_2 \text{ (equation 2)}$$

Where $K$ is a constant equal to the oscillator frequency, $N_1$ is the count fixed in the counter 20, and $N_2$ is the total number of counts, counter 50 has gone through. If the number stored indicates only the additional counts, the number of complete cycle counts must be added to the stored number before applying equation 2.

The high frequency oscillator runs completely unsynchronized with respect to the variable input frequency and has a very small error with high oscillator frequencies. For an oscillator frequency of 200 kc. and a time period of $l \approx 75$ ms., the measurement is accurate within 0.0067 percent.

The invention therefore provides a virtually errorless recording and play back of variable frequency inputs enabling for example a rapid continuous sampling of sound velocity in water. Additionally, the frequency to binary conversion requires drift-free low maintenance and inexpensive electronics in which no synchronization networks or rate multiplication circuits are required.

From the foregoing it will now be apparent that a new and improved frequency to binary converter has been found. It should be understood of course that the embodiment disclosed is merely illustrative and is not intended to limit the scope of the invention. Reference should be made to the appended claims, therefore, rather than the specification as indicating the scope of the invention.

What is new and desired to be secured by Letters Patent of the United States is:

1. A frequency to binary converter system comprising
a first counter having a plurality of stages,
a second counter having a plurality of stages,
means in said first counter for preselecting a predetermined number of pulses to be counted,
means in said second counter for measuring the time period required for said first counter to count said predetermined number of pulses,
variable frequency input means connected to said first stage of said first counter for receiving a variable frequency signal input and supplying pulse signals to said first counter at a rate equal to said frequency signal,
a high frequency oscillator connected to the input of said second counter for supplying pulses to said second counter at a constant predetermined rate, said second counter counting up said pulses supplied thereto,
gating means connecting the outputs of said first counter to said oscillator for enabling said oscillator at the end of the first count and inhibiting the oscillator at the end of said predetermined number of pulse counts, and
binary storage means connected to said second counter for registering the number in said second counter at the end of said time period.

2. The apparatus of claim 1 further comprising means for transferring the number stored in said second counter a predetermined time after the end of said time period.

3. The apparatus of claim 1 further comprising means for resetting said counters a predetermined time after the transfer of said number to binary registers.

4. The apparatus of claim 1 further comprising means for sampling a variable frequency input signal for a predetermined sampling duration.

5. The apparatus of claim 1 wherein said gating means comprising a pulse shaper, a bistable flip-flop circuit, and an AND gate, said AND gate connected to the outputs of each of said stages in the first counter, said flip-flop circuit has a set input connected to an output of the first stage of the first counter and a reset input connected to the output of said AND gate, said pulse shaper having an input connected to the output of the flip-flop circuit and a signal path connecting said high frequency oscillator to the first stage of said second counter.

6. The apparatus of claim 5 further comprising means for transferring the number stored in said second counter a predetermined time after the end of said time period.

7. The apparatus of claim 6 further comprising means for resetting said counters a predetermined time after the transfer of said number to binary registers.